United States Patent [19]

Qvart

[11] Patent Number: 4,932,813
[45] Date of Patent: Jun. 12, 1990

[54] MILLING TOOL AND A CASSETTE

[75] Inventor: Ingemar T. Qvart, Valbo, Sweden

[73] Assignee: Sandvik AB, Sandviken, Sweden

[21] Appl. No.: 214,405

[22] Filed: Jul. 1, 1988

[30] Foreign Application Priority Data

Jul. 6, 1987 [SE] Sweden ............................ 8702779

[51] Int. Cl.$^5$ .............................................. B26D 1/32
[52] U.S. Cl. ...................................... 407/46; 407/36; 407/49; 407/51
[58] Field of Search ................ 407/46, 36, 37, 38, 407/39, 76, 43, 47, 49, 51

[56] References Cited

U.S. PATENT DOCUMENTS 2,378,215  6/1945  Grayson .................................. 407/39

FOREIGN PATENT DOCUMENTS 2522735  5/1975  Fed. Rep. of Germany ........ 407/49

Primary Examiner—Frederick R. Schmidt
Assistant Examiner—Lawrence Cruz
Attorney, Agent, or Firm—Burns, Doane, Swecker & Mathis

[57] ABSTRACT

A rotary milling tool comprises a cutter body, a plurality of cassettes mounted in respective recesses formed around an outer periphery of the body, and a plurality of fasteners applying retaining forces to respective cassettes. Each retaining force comprises a radial inward component and a component directed opposite the direction of rotation of the body. The radial inward component wedges the cassette against first and second radially outwardly divergent walls of the recess. The other component wedges the cassette against the second wall and a third wall which are forwardly convergent.

4 Claims, 2 Drawing Sheets

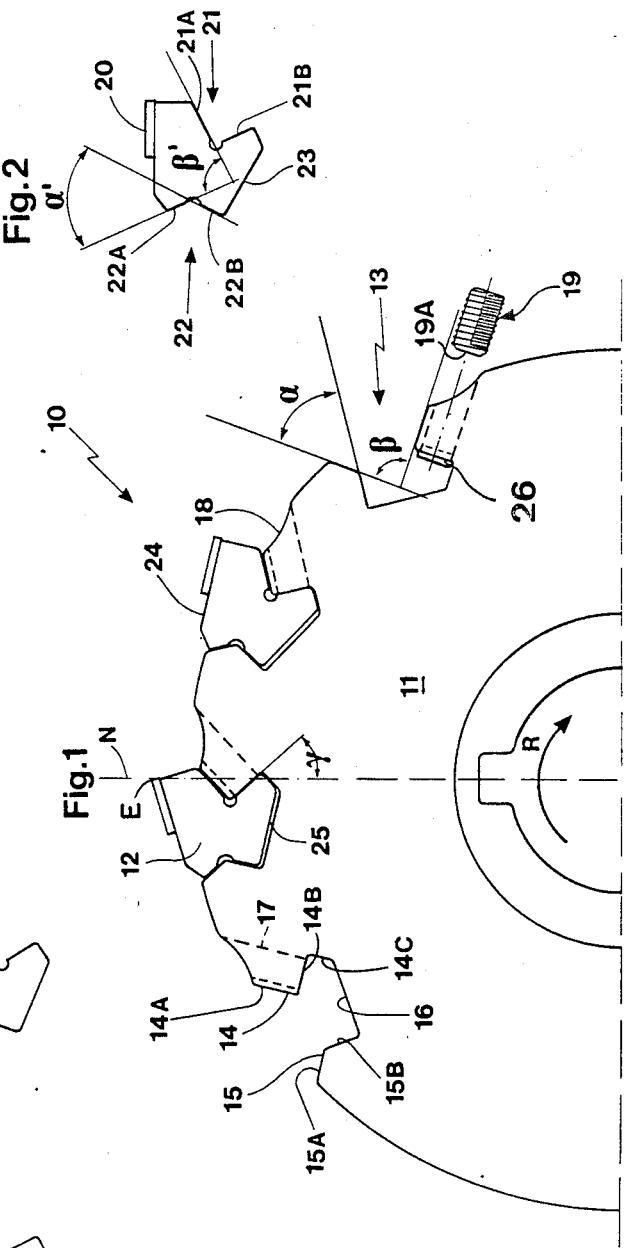
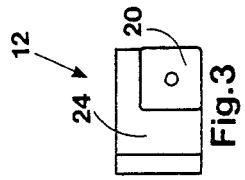
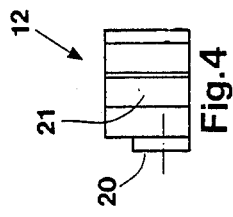
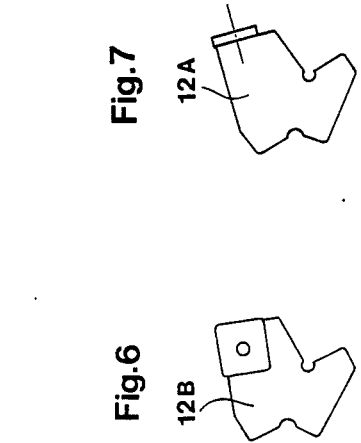

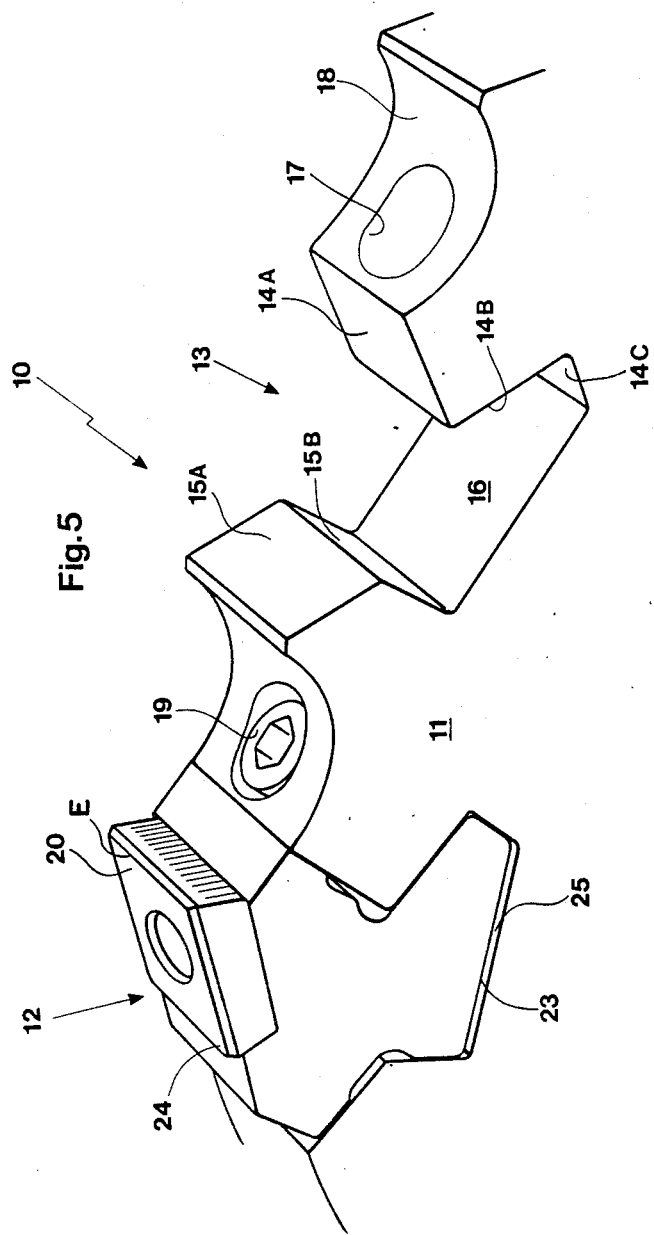

MILLING TOOL AND A CASSETTE

BACKGROUND AND OBJECTS OF THE INVENTION

The present invention relates to a milling tool having at least one cassette provided with a cutting insert, which has a forward side and a rear side. The cassette is releasable mounted to and adjustable in a recess in the body of the milling tool. The milling tool has a center axis and a direction of rotation. The cassette is releaseable and adjustable essentially only parallel with the center axis of the milling tool. The invention further relates to a cassette to be used in a tool.

A tool of the above described type is previously known, which has a cassette, which can be mounted axially in the body of the milling tool. The planar cooperating surfaces of the cassette and the recess diverge radially inwardly and a screw forces the cassette in the direction of divergence and therefore the cassette will not have a maximum resistance in all directions against tilting.

An object of the present invention is to provide a milling tool whose cassettes are easily adjustable and exchangeable.

Another object of the present invention is to provide a milling tool with tightening means which positively hold the cassettes in place.

Still another object of the present invention is to provide a tool wherein the cassette can be moved in the tool body only in the axial direction of the body and thus achieve resistance in four different directions against tilting.

THE DRAWINGS

The present invention will be more closely described hereinafter in connection with the accompanying drawings.

FIG. 1 shows a part of a side-milling cutter according to the invention in a side view.

FIGS. 2, 3 and 4 show a cassette for a side-milling cutter in a side view, a top view and a front view, respectively.

FIG. 5 shows a part of the side-milling cutter according to FIG. 1 in a perspective view.

FIGS. 6 and 7 show alternative embodiments of the cassette.

DETAILED DESCRIPTION OF PREFERRED EMBODIMENTS OF THE INVENTION

FIGS. 1-5 show a part of a milling cutter 10 and cassettes. The cutter 10 is a side-milling cutter, which has the basic shape of a circular disc having a relatively small thickness, about 10 to 50 mm. The body 11 of the cutter is provided with a plurality of recesses 13 at its periphery arranged to receive cassettes 12 provided with cutting inserts. Each recess 13 comprises a forward, R, wall 14, a rear wall 15 and a bottom 16. A wall is considered to be "forward" of another wall if it is spaced therefrom in the same direction as the direction of rotation R of the body 11. The forward wall 14 has three planar sections, i.e. a radially outer section 14A, a mid-section 14B and a radially inner section 14C. The outer section 14A and the mid-section 14B form a V-shape whose apex points in a direction opposite to the rotational direction R. The section 14C connects the mid-section 14B to the bottom 16. The bottom 16 is planar and extends from the section 14C rearwardly and radially outwardly, where it meets the rear wall 15. The rear wall comprises two planar sections, i.e. a radially outer section 15A and a radially inner section 15B. The sections 15A and 15B form a V-shape whose apex points in the same direction as the rotational direction R. All abovementioned sections are parallel with the center axis of the milling cutter. The outer section 15A of the rear wall 15 forms an angle $\alpha$ with an extension of the inner section 15B and forms an angle $\beta$ with the outer section 14A of the forward wall 14. The angle $\alpha$ is between 60° and 120°. The angle $\beta$ is also between 60° and 120°. The forward wall 14 is provided with a threaded through bore 17. The bore extends from a chip surface 18 in front of the forward wall and terminates centrally in the mid-section 14B. The bore 17 is mainly perpendicular to the mid-section 14B, which forms an angle $\gamma$ between 25° and 65° with a radius N of the cutter which intersects the active forward cutting edge E of the cutting insert 20. The bore 17 is provided to receive a screw 19. The radially outer end 19A of the screw 19 has means, for example a groove, for engagement with a key or a chisel and the radially inner end of the screw is provided to abut against a mid-section 21B of the cassette.

The cassette 12 carries a tangentially mounted insert 20. The cassette has a mounting portion defined by a forward side 21 and a rear side 22, with reference to the rotational direction of the tool. Furthermore the cassette has a planar lower side 23, an upper side 24 and two side surfaces. The forward side 21 and the rear side 22 are V-shaped and the apex of the formed V are directed towards each other. They are in shape identical with the sections 14A-15B described above. The ranges of the angles $\alpha$ and $\beta$ are as described above with respect to angles $\alpha$ and $\beta$. The sides 21 and 22 are preferably provided with clearances formed in the bottoms of the concavities. Furthermore the clearances are formed at the imaginary apices of the sections 21A,21B and 22A,22B, respectively, such that the sides 21 and 22 become as short as possible in the radial direction of the cutter in order to achieve three line contacts between the cassette and the cutter body. Each line contact is maximum 3 mm in width. An inner portion of the mounting portion, defined by the Mid section 21B of the forward side 21 and the radially inner section 22B of the rear side 22, thus has a dove-tail profile and the width between said sections 21B and 22B increases towards the lower side 23 of the cassette. An outer portion of said mounting portion, defined by the radially outer section 21A of the forward side 21 and the radially outer section 22A of the rear side 22, has a dove-tail profile and connects to said inner portion and increases in width in direction away from the lower side 23 towards the cutting insert 20 so as to form a waist at the cassette.

During mounting the cassette is inserted in one of the two possible directions parallel with the center axis of the cutter into the recess 13 of the cutter. Thus the cassette slides on the sections 15A, 15B and 14A, i.e. the sections 22A, 22B and 21A at the cassette corresponding to the sections 15A, 15B and 14A will engage the recess 13. When the cassette has reached the desired position, the screw 19 is tightened to abut against a reaction surface defined by the mid-section 21B at the forward side of the cassette. Thus the cassette is forced in two directions, i.e. in direction radially inwardly and in direction opposite to the rotational direction. Thus the cassette is wedged firmly in two directions; against the radially outer sections 14A and 15A of the recess 13 and against the sections 15A and 15B. The cassette becomes positively secured and resistant against tilting in its desired position. A play 25 between the lower side 23 of the cassette and the bottom of the recess 13 must always be present in order to allow radial movability of the cassette during mounting.

In FIGS. 6 and 7 cassettes 12A and 12B are shown wherein the cutting inserts are mounted axially and radially, respectively.

Alternatively the screw 19 may be replaced by an eccentric, a conical wedge or the like. The tightening means may alternatively react from behind in the rotational direction R at the section 22B of the cassette. A resilient disc or washer 26 may be situated between the mid-section 14B of the recess, around the inner end of the tightening means, and the mid-section 21B of the cassette to increase friction and therefore facilitate adjustment of the cassette. The disc 26 is preferably made of Teflon ®.

The cassette may alternatively be used in a face-milling cutter or in a draw broach.

Thus the invention relates to a milling tool and a cassette wherein the tool body receives cassettes provided with cutting inserts in a safe and tilting resistant manner. The cassettes are replaceable and are easy to adjust into a desired position.

I claim:

1. A rotary milling tool comprising a cutter body and a plurality of cassettes mounted in respective recesses formed around an outer periphery of said body, each said recess having forward and rear walls interconnected by a bottom, said rear wall including a radially outer planar rear wall section and a radially inner planar rear wall section, the radially outer and inner rear wall sections forming a first angle therebetween and converging in a forward direction corresponding to a direction of rotation of said cutter body, said forward wall including a planar forward wall section spaced from said radially outer rear wall section in said forward direction, said forward wall section and said radially outer rear wall section diverging in a radially outer direction to form a second angle therebetween, each cassette including forward and rear sides, said rear side comprising radially outer and inner planar rear side sections forming a third angle therebetween and arranged in contact with said radially outer and inner rear wall sections, respectively, said third angle corresponding to said first angle, said forward side including a planar forward side section, said forward side section and said radially outer rear side section forming a fourth angle therebetween and arranged in contact with said forward wall section and said radially outer rear wall section, respectively, said fourth angle corresponding to said second angle, each cassette including an active cutting edge facing in said forward direction and arranged such that a radius of said cutter body intersecting said active cutting is disposed forwardly of said radially outer and inner rear wall sections in said forward direction, a plurality of fasteners for releasably securing respective cassettes in said recesses, each said fastener begin accessible from outside of said cutter body and arranged to act against a reaction surface of a respective cassette for applying to said cassette a force having a radially inwardly directed component for forcing said forward side section and said radially outer rear side section against said forward wall section and said radially outer rear wall section, respectively, and a component directed opposite said direction of rotation for forcing said radially outer and inner rear side sections against said radially outer and inner rear wall sections, respectively, said reaction surface being located radially inwardly of said forward wall section and said radially outer rear wall section, said cassette including a radially inwardly facing lower side disposed opposite and spaced radially outwardly from said bottom of said recess to form a clearance therewith.

2. A rotary milling tool according to claim 1, wherein said reaction surface diverges from said forward side section in said forward direction.

3. A rotary milling tool according to claim 1, wherein each of said first and second angles is in the range of 60 to 120 degrees.

4. A rotary milling tool according to claim 1, wherein said fastener comprises a screw, a longitudinal end of which engages said reaction surface.

* * * * *